United States Patent Office 3,451,783
Patented June 24, 1969

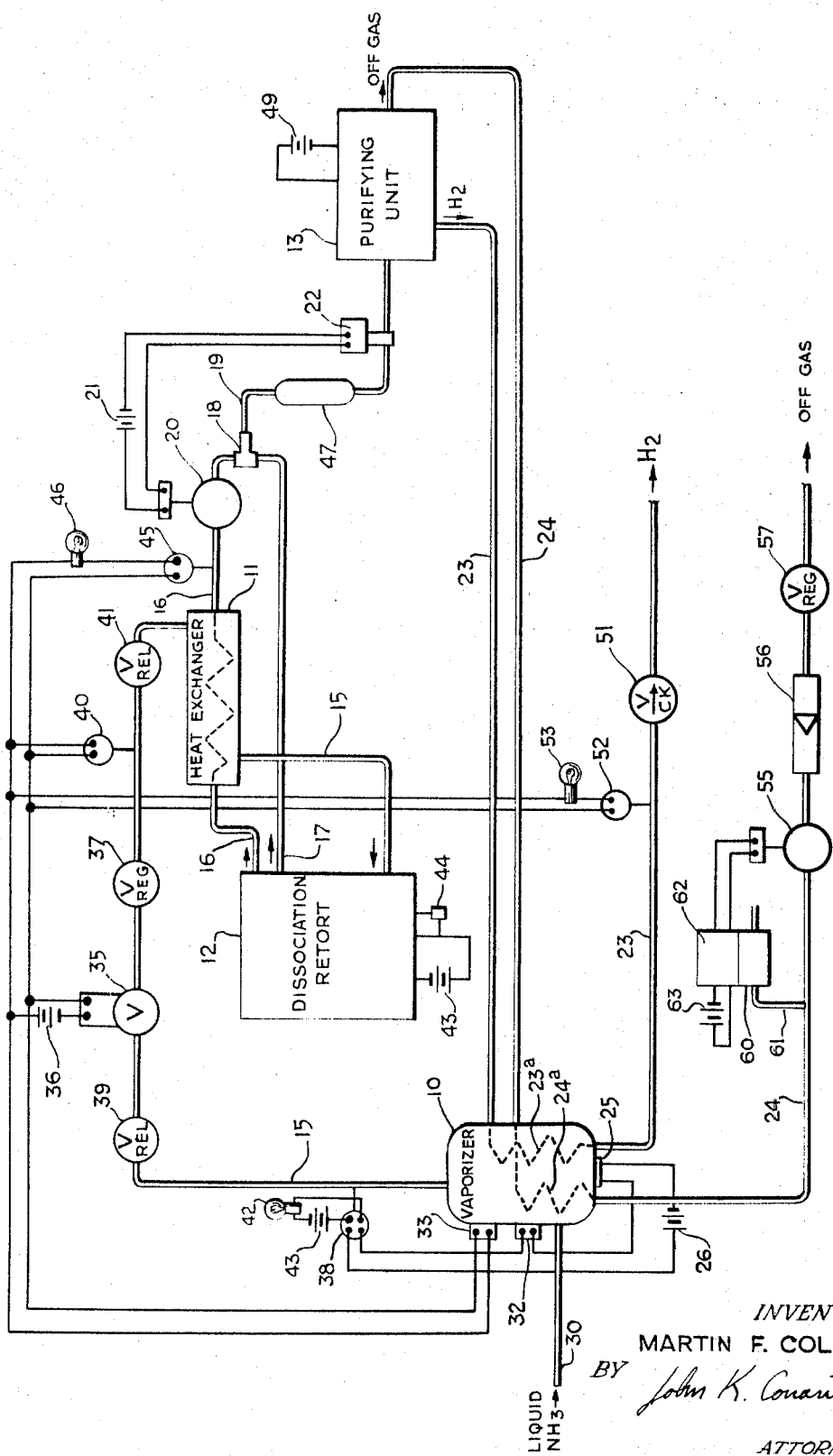

3,451,783
HYDROGEN GENERATOR
Martin F. Collins, Jersey City, N.J., assignor to Engelhard Industries, Inc., Newark, N.J., a corporation of Delaware
Filed Dec. 18, 1964, Ser. No. 419,435
Int. Cl. C01b 1/04; B01d 53/22
U.S. Cl. 23—281                                    1 Claim

ABSTRACT OF THE DISCLOSURE

A generator for producing hydrogen from ammonia comprising, a dissociation retort wherein ammonia is dissociated by application of heat, a purifying unit wherein hydrogen is separated from dissociated ammonia at a temperature lower than the temperature of the dissociated ammonia emerging from said retort, a first and a second conduit for conducting dissociated ammonia from the retort, means for cooling dissociated ammonia in the first conduit to a temperature lower than the temperature at which hydrogen is separated from dissociated ammonia in the purifying unit, means for combining dissociated ammonia from the first and second conduits in a proportion to produce a predetermined resultant temperature of the combination, a third conduit for conducting dissociated ammonia combined from the first and second conduits to the purifying unit, a catalytic oxygen removal means in the third conduit for the elimination of traces of oxygen which may be present in the dissociated ammonia passing through the third conduit, and means for conducting hydrogen and the remainder of the dissociated ammonia from the purifying unit through the vaporizer and out of the generator.

In the hydrogen generator of this invention liquid ammonia is vaporized and dissociated into a mixture of hydrogen and nitrogen. The mixture is then passed through a purifying unit in which the hydrogen is separated from the mixture by diffusion through a palladium alloy membrane.

The structure and operation of the purifying unit is based on a unique property of palladium and its alloys by which it is selectively permeable to hydrogen. Hydrogen will permeate and diffuse through a non-porous membrane of palladium or a palladium alloy while other gases will not. In purifying apparatus utilizing this property, a gas mixture containing hydrogen is brought in contact with one side of a palladium alloy membrane. Then by creating a pressure differential so that the partial pressure of hydrogen in the mixture at one side of the membrane is greater than the pressure at the other, hydrogen from the mixture diffuses through the membrane to the other side.

In the purifying unit normally used in a hydrogen generator of the present invention the palladium alloy membrane is provided in the form of tubes which are sealed through a collecting chamber. The dissociated ammonia consisting of a mixture of hydrogen, nitrogen and some impurities flows through the tubes. The hydrogen diffuses through the tube walls into the surrounding collecting chamber and the remaining gas, the "off gas," flows out the tubes.

While the purifying unit is described herein as the type in which the palladium alloy membranes are provided in the form of tubes it will be appreciated that the membranes may be in any suitable form such as foils or supported films as illustrated by U.S. Patent No. 2,958,-391 to A. J. De Rosset without departing from the scope or spirit of the present invention.

The rate of diffusion of hydrogen through the palladium alloy membrane is a function of a number of factors including the surface area of the membrane, its thickness, the pressure differential across the membrane and the temperature inside the diffusion unit. In particular the rate of diffusion varies exponentially with the temperature, increasing at a decreasing rate as the temperature increases.

Heating elements are provided in the purifying unit to preheat the interior to the temperature which produces the most efficient rate of diffusion, but, in order to maintain the interior temperature at the most efficient level during operation, the gas mixture flowing into the purifying unit should be at approximately the same temperature as the interior of the unit.

However, the gas mixture from the dissociation retort has been heated by the dissociation considerably above the temperature at which the purifying process is most efficient. Consequently, it is a problem to cool the gas mixture to the desired level before it enters the purifying unit.

A principal object of the present invention is to provide a hydrogen generator of the type described which includes novel temperature adjusting means for regulating the temperature of the gas mixture to the hydrogen purifier.

A further object is to provide a hydrogen generator in which a part of the heating and cooling required in its operation is provided by exchange of heat within the generator thereby achieving economy of construction and operation by reducing the size and energy consumption of the heating elements required and by eliminating the necessity for a separate cooling unit.

In the process of hydrogen generation from liquid ammonia with which the invention is concerned, the vaporized ammonia must be heated for dissociation in the dissociation retort, but the gas mixture emerging from the retort is too hot for the purification step.

In accordance with the invention the vaporized ammonia and one of two streams of the hot gas mixture from the dissociation retort are passed through a gas to gas heat exchanger. The hot gas mixture gives up heat to the vaporized ammonia. The vaporized ammonia is thus preheated preparatory to dissociation while the hot gas mixture is cooled.

The capacity of the heat exchanger and the gas pressures and flow rates are selected and regulated so that the stream of the hot gas mixture fed through the heat exchanger is cooled below the temperature desired for the gas mixture entering the purifying unit.

The stream of the cooled gas mixture from the heat exchanger is fed through a control valve into a mixer. The other stream of the hot gas from the dissociation retort also feeds into the mixer which combines the hot and the cooled streams into a single stream which is conducted to the purifying unit.

The control valve in the cooled gas stream is used to adjust the flow of cooled gas to the mixed and thus to adjust the proportion of cooled gases to hot gases being combined in the mixer. This proportion determines the resultant temperature of the combined stream of gases from the mixer and adjustment of the control valve is regulated by signals from a thermostat in the combined stream of gases entering the purifying unit so that the cooled and hot gases are mixed in appropriate proportion to have the resultant temperature of the combined stream at the level desired for the purifying unit.

When the purified hydrogen and the off gas emerge from the purification unit they are still hot and are conducted through coils in the vaporizer to vaporize liquid ammonia which is the first step in the hydrogen generation process carried out by a generator of this invention.

The vaporizer is provided with an electric heating element to vaporize liquid ammonia when the generator is first started, but after purified hydrogen and off gas start flowing from the purifying unit the heat available from these gases is sufficient to continue the vaporization while the generator is in operation. The heating element may therefore be turned off after the initial start up of the generator.

Additional objects and advantages of the hydrogen generator of the present invention will be apparent from the following detailed description taken in connection with the accompanying drawing which is a schematic flow and electric circuit diagram of a hydrogen generator in accordance with the invention.

Referrng now to the drawing, the hydrogen generator of the present invention, which is adapted to produce ultra-pure hydrogen from liquid ammonia, comprises generally a vaporizer 10, a heat exchanger 11, a dissociation retort 12 and a purifying unit 13.

In the following description the general structure and operation of the generator of this invention are described first after which the components are described in more detail.

In the operation of the generator, liquid ammonia is vaporized in the vaporizer 10 and is carried by a conduit 15 through the heat exchanger 11 to the dissociation retort 12 in which the vaporized ammonia is dissociated into a mixture of hydrogen, nitrogen and any impurities, such as water, which were in the ammonia or in the generator. The mixed gases are taken from the dissociation retort 12 in two streams by conduits 16 and 17. The conduit 16 carries one stream through the heat exchanger 11 to a mixer 18, which is an orifice T. The other stream is carried by the conduit 17 directly from the dissociation retort 12 to the mixer 18 and the two streams which combine in the mixer are carried from the mixer to the purifying unit 13 by a conduit 19.

The dissociation of ammonia in retort 12 is carried out by passing the vaporized ammonia through a bed of a precious metal catalyst at a high temperature. The dissociated ammonia, hereafter referred to as the mixture of gases or gases, emerges from the retort at a high temperature and must be cooled before it is fed to the purifying unit in order for the purifying unit to operate at its most efficient rate consistent with long service life. In practice the temperature of the mixture of gases (1,200–1,700° F.) from the retort 12 is considerably above the temperature (840° F.) at which it is desired to have the mixture when it is fed into the purifying unit.

In the generator of the present invention the cooling of the mixture of gases from the retort 12 is accomplished by dividing the mixture into two streams, cooling one in the heat exchange 11 below the temperature subsequently desired, and then blending the two streams in the mixer 18 in a proportion of hot gases to cooled gases such that the gases in the conduit 19 to the purifying unit 13 will be at the most efficient temperature for the purification step.

In the heat exchanger 11 the stream of hot gases through the conduit 16 is cooled by giving up heat to th evaporized ammonia which is conducted through the heat exchanger on its way to the dissociation retort 12. Thus, in addition to cooling one of the streams of hot gases, the heat exchanger preheats the vaporized ammonia for the dissociation step.

The blending of the stream of cooled gases from the heat exchanger 11 with the stream of hot gases from the retort 12 in the mixer 18 is regulated by a control valve 20 in conduit 16 between the heat exchanger 11 and the mixer. The control valve 20 is electrically operated from a power source which, for the sake of simplicity, is shown as a battery 21. Hereafter the power sources for various electrically operated valves, heaters and switches subsequently to be described are shown as batteries for the sake of simplicity of illustration, but it will be appreciated they will normally be powered from a single source of power through appropriate circuitry. Pneumatically operated controls may also be used.

The opening and closing of the control valve 20 is adjusted to regulate the flow of cooled gases to the mixer 18 in accordance with signals from a thermostat 22 which is connected in the conduit 19 so as to be responsive to the temperature of the gases flowing to the purifying unit 13 from the mixer 18. The control valve 20 thus regulates the proportion of cooled gases combined with hot gases in the mixer 18 so that the resultant temperature of the combination will be the temperature desired for the purifying step.

In the purifying unit 13 hydrogen is separated from the mixture by diffusion through the walls of palladium alloy tubes and emerges from the unit into a conduit 23. The off gas from the purifying step leaves the purifying unit through a conduit 24.

When the purified hydrogen and off gas emerge from the purification unit 13 they are quite hot and this heat is used to vaporize liquid ammonia in the vaporizer 10. For this purpose the conduits 23 and 24 include coiled portions 23a and 24a within the vaporizer 10 so that the hydrogen and off gas flowing through the coiled portions give up heat to the liquid ammonia. When the flow rate of the hydrogen and off gas is over a certain minimum, which it will be during the usual operation of the generator, the heat thus supplied is sufficient to vaporize the ammonia for the operation of the generator. At start-up and when the flow rate of hydrogen and off gas falls below the minimum necessary to supply the heat for vaporization, the required heat is supplied by an electric immersion heater 25 in the vaporizer 10. The heater 25 is illustrated as being powered by a battery 26.

The structure and operation of the elements of the generator of this invention will now be described in more detail.

Liquid ammonia from a source (not shown) is fed into the vaporizer 10 under a predetermined minimum pressure through an inlet conduit 30. When the ammonia fed into the vaporizer rises tothe level of a lower liquid level switch 32 it actuates the switch to turn on the immersion heater 25 which supplies heat to begin the vaporization of the ammonia. The switch 32 is actuated to turn off the heater 25 when the liquid level of the ammonia drops below the switch 32. In practice the vaporizer may also include an over temperature switch (not shown) to turn off the heater 25 if the vaporizer becomes overheated.

An upper liquid level switch 33, which is in the vaporizer above the lower liquid switch 32, is actuated if the level of the liquid ammonia reaches the switch 33 which would normally occur only if the vaporized ammonia is drawn off more quickly than it is formed or if the lower level switch 32 of the heater 25 should fail to operate. Actuation of the upper level switch 33 closes a solenoid valve 35 in the conduit 15 thereby shutting off the flow of vaporized ammonia to the dissociation retort 12 and stopping the operation of the generator.

The solenoid valve 35 is indicated as powered by a battery 36 and as illustrated in the drawing is connected to be actuated by a number of pressure responsive switches at various points in the generator as subsequently described.

The vaporized ammonia from the vaporizer 10 flows in the conduit 15 through the heat exchanger 11 to the dissociation retort 12 and the pressure of this flow is regulated by a pressure regulator 37 in the conduit 15 between the vaporizer 10 and heat exchanger 11.

Included in the portion of the conduit 15 between the vaporizer 10 and the pressure regulator 37 are a dual pressure switch 38, a pressure relief valve 39, and the solenoid valve 35. A second pressure switch 40 and pressure relief valve 41 are provided in the conduit 15 between the pressure regulator 37 and the heat exchanger 11.

The dual pressure switch 38 which is normally closed, is connected to be actuated and shut off the heater 25 in the vaporizer 10 if the vapor pressure of ammonia in the conduit 15 exceeds a desired limit. The switch 38 is also connected to turn on a signal light 42, powered by battery 43, if the vapor pressure drops below a desired minimum, which indicates low ammonia supply pressure.

The pressure relief valve 39 is adapted to vent the ammonia in the conduit 15 to the atmosphere if the pressure in the conduit 15 becomes too high. As previously mentioned actuation of the solenoid valve 35 closes the conduit 15 and stops the flow of vaporized ammonia from the vaporizer.

The pressure switch 40 in the conduit 15 between the pressure regulator 37 and the heat exchanger 11 is arranged to be actuated and close the solenoid valve 35 if the vapor pressure in this portion of the conduit exceeds a predetermined level. A further increase of pressure to an undesired level (170 p.s.i.g.) opens the pressure relief valve 41 which vents the vapor to the atmosphere.

The vaporized ammonia is conducted by the conduit 15 through the heat exchanger 11 to the dissociation retort 12 in which the vaporized ammonia is dissociated into hydrogen and nitrogen by being passed through a heated bed of a suitable catalyst such as a ruthenium catalyst. The dissociation retort comprises a plurality of tubes packed with a 0.5% ruthenium catalyst supported on particles of alumina through which the vaporized ammonia flows. The dissociation is carried out at a temperature of about 1,200–1,700° F. which is provided by electric heating elements in the walls of the retort powered from a source indicated by the battery 43. The temperature is regulated by a thermostatic control indicated at 44.

The mixture of hydrogen and nitrogen emerges from the dissociation retort 12 at a temperature which is considerably above the preferred temperature for the purifying step. It is therefore necessary to cool the mixture of gases before it is fed into the purifying unit. As already described this is accomplished by conducting the gases from the dissociation retort 12 in two streams. One flows through the conduit 17 to the mixer 18 and the other is conducted by the conduit 16 through the heat exchanger 11 to the mixer 18. The stream through the heat exchanger gives up heat to the vaporized ammonia which is conducted through the heat exchanger conduit 15 which carries it to the dissociation retort. Thus the vaporized ammonia is preheated before entering the retort and the hot gases through the conduit 16 are cooled to a temperature (about 500° F.) which is below the temperature desired for the mixture of gases entering the purifying unit 13.

The hot gases and cooled gases are then combined in the mixer 18 in a proportion regulated by the control valve 20 and thermostat 22 such that the resultant temperature of the gases flowing through the conduit 19 from the mixer is the temperature desired for the purifying step.

As shown in the drawing a pressure switch 45 is provided in the conduit 16 between the heat exchanger 11 and control valve 20. This switch 45 is actuated to close solenoid valve 35 and turn on a signal light 46 if the vapor pressure in conduit 16 drops below a predetermined level which would indicate a leak in either the conduit 16 or in the dissociation retort 12.

The conduit 19 which conducts the mixed gases from the mixer 18 to the purifying unit 13 includes an oxygen removal unit 47 which removes any traces of oxygen from the gases before they enter the purifying unit 13. If oxygen were to get into the purifying unit, the contact of oxygen with the palladium alloy diffusion tubes in the presence of hydrogen could result in catalyst combustion of the hydrogen and oxygen with possible local overheating which could rupture the tubes. The oxygen removal unit contains a palladium catalyst on an alumina support and catalytically combines any oxygen present with hydrogen to form water. This method of oxygen removal is described in U.S. Patent No. 2,582,885 to E. F. Rosenblatt.

In the purifying unit 13 hydrogen is separated from the mixture of hydrogen and nitrogen by diffusion through tubes of palladium alloyed with silver. This type of hydrogen purifier is illustrated by U.S. Patent No. 2,911,057 to R. B. Green et al. The gas mixture flows through the tubes and diffuses through the tube walls into a surrounding chamber from which it flows out of the unit into the conduit 23. The remainder of the mixture from which hydrogen has been removed, i.e., the off gas, continues through the tubes and out of the unit to conduit 24.

Heat and pressure are applied in the purifying unit 13 for the diffusion purification process. The gas mixture is under pressure when it is delivered to the purifying unit 13 and the pressure within the unit is maintained by a back pressure regulator 57 in the conduit 24. At start-up heat is provided in the purifying unit 13 by a small voltage electric heating element (not shown) in the walls of the unit. The heating elements are powered from a source indicated by battery 49 and are of a size to maintain proper temperature without use of thermostatic controls.

As previously described, the conduits 23 and 24 conduct the purified hydrogen and off gas through coils 23a and 24a in the vaporizer 10 where the heat from these gases vaporized the liquid ammonia in the vaporizer. The conduit 23 then conducts the purified hydrogen through a check valve 51 and out of the generator to the point of storage or use. A pressure switch 52 is provided in the conduit 23 between the vaporizer 10 and the check valve 51 and is actuated to close the solenoid valve 35 and turn on a signal light 53 if the pressure in conduit 23 exceeds a predetermined amount which would indicate a leak in the palladium alloy diffusion tubes in the purifying unit 13.

From the vaporizer 10 the conduit 24 conducts the off gas through an electrically or pneumatically operated control valve 55, a flow meter 56, and a back pressure regulator 57 from which it is vented to the atmosphere or disposed of in any other suitable manner.

The off gas in the conduit 24 is continuously analyzed for hydrogen content by a hydrogen analyzer 60. As shown, a continuous sampling of the off gas is taken from the conduit 24 by a pipe 61 tapped into the conduit 24 to conduct a continuous sampling of the off gas through the analyzer. A recorder-controller 52 responsive to the analysis of the analyzer 60 is connected to regulate the control valve 55 which is operated by a power source indicated by battery 63. This arrangement is adapted to control automatically the percent hydrogen in the off gas. It will be appreciated of course that pneumatically operated controls could be substituted.

The hydrogen analyzer 60 continuously determines the percent hydrogen in the off gas and causes the recorder controller 62 to transmit a signal to the control valve 55 which operates to open or close the valve to adjust the off gas flow rate in accordance with a predetermined setting of the recorder controller.

When the purifying unit 13 is operating under steady conditions of temperature and pressure, an increase in the off gas flow rate increases the percentage of hydrogen in the off gas. This also increases the flow rate of pure hydrogen from the purifying unit. Conversely, a decrease in the off gas flow rate will decrease the hydrogen content of the off gas and decrease the flow rate of pure hydrogen. Thus the recorder controller 62 is set and adjusted to open or close the control valve 55 to secure a flow rate of off gas which results in the desired hydrogen content for the off gas and flow rate of pure hydrogen.

The percent of hydrogen in the off gas can only be reduced to a theoretical minimum since the diffusion of hydrogen to the palladium alloy tubes in the purifying unit 13 ceases when the hydrogen partial pressure is the same inside and outside the tubes. This minimum percent is governed by the pressure of dissociated ammonia to the purifying unit and the pressure of the pure hydrogen flowing from the unit. It is equal to the pure hydrogen pressure (p.s.i.a.) multiplied by one-hundred and divided by the pressure (p.s.i.a.) of the dissociated ammonia.

The invention claimed is:

1. A generator for producing hydrogen from liquid ammonia comprising a vaporizer wherein liquid ammonia is vaporized by application of heat, a dissociation retort wherein vaporized ammonia is dissociated at a temperature higher than the temperature of vaporized ammonia from the vaporizer, a purifying unit wherein hydrogen is separated from dissociated ammonia at a temperature lower than the temperature of the dissociated ammonia emerging from said retort, a heat exchanger, conduit means for conducting the vaporized ammonia from the vaporizer through the heat exchanger to the retort, a mixer, a first conduit for conducting a stream of dissociated ammonia from the retort through the heat exchanger to the mixer whereby dissociated ammonia in the first conduit gives up heat to the vaporized ammonia in the heat exchanger, a second conduit for conducting another stream of dissociated ammonia from the retort to the mixer, a third conduit for conducting dissociated ammonia from the mixer to the purifying unit, valve means connected to control the proportion of dissociated ammonia flowing into the mixer respectively from the first and second conduits, control means responsive to the temperature of dissociated ammonia in the third conduit and operatively connected to the valve means to adjust the proportion of dissociated ammonia entering the third conduit respectively from the first and second conduits to produce a predetermined resultant temperature of dissociated ammonia in the third conduit, a catalytic oxygen removal means in the third conduit for the elimination of traces of oxygen which may be present in the dissociated ammonia passing through the third conduit, and means for conducting hydrogen and the remainder of the dissociated ammonia from the purifying unit through the vaporizer and out of the generator.

References Cited

UNITED STATES PATENTS

| 2,958,391 | 4/1958 | De Rosset | 55—16 |
| 3,025,145 | 3/1962 | Terpenning | 23—281 X |
| 3,336,730 | 8/1967 | McBride et al. | 55—16 |
| 2,354,997 | 8/1944 | Krogh | 236—12 |
| 2,551,697 | 5/1951 | Palmatier | 165—36 |

OTHER REFERENCES

Haines, John E., Automatic Control of Heating and Air Conditioning, 2d ed., p. 366, 1961.

MORRIS O. WOLK, *Primary Examiner.*

M. D. BURNS, *Assistant Examiner.*

U.S. Cl. X.R.

55—16